J. CASE.
Bee Hive.
No. 7,779.
Patented Nov. 19, 1850.
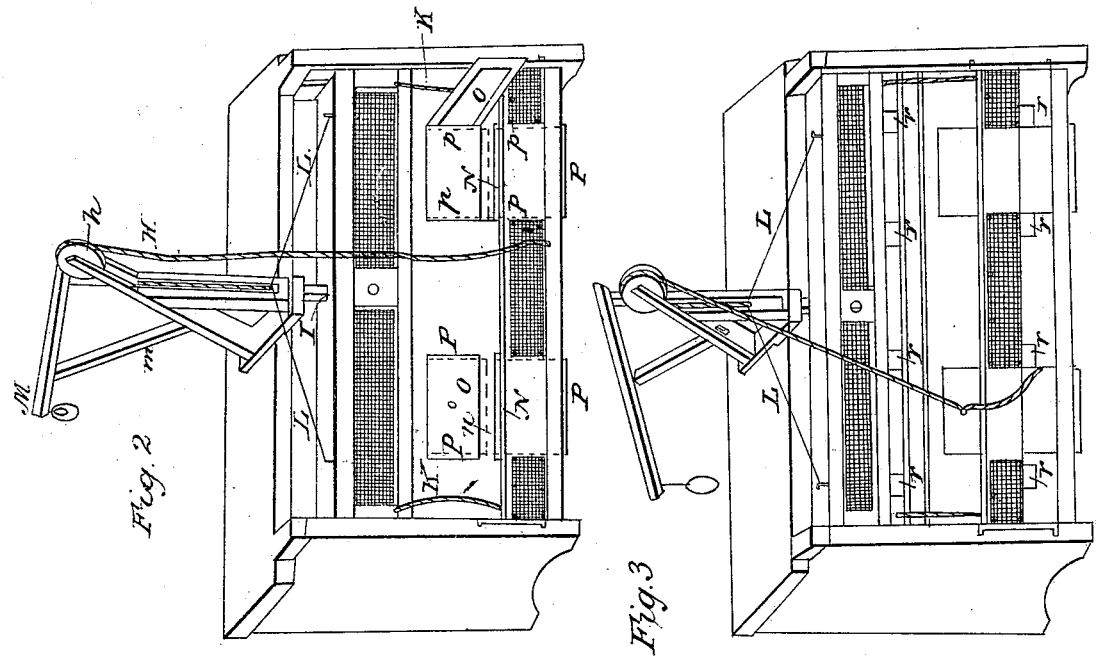
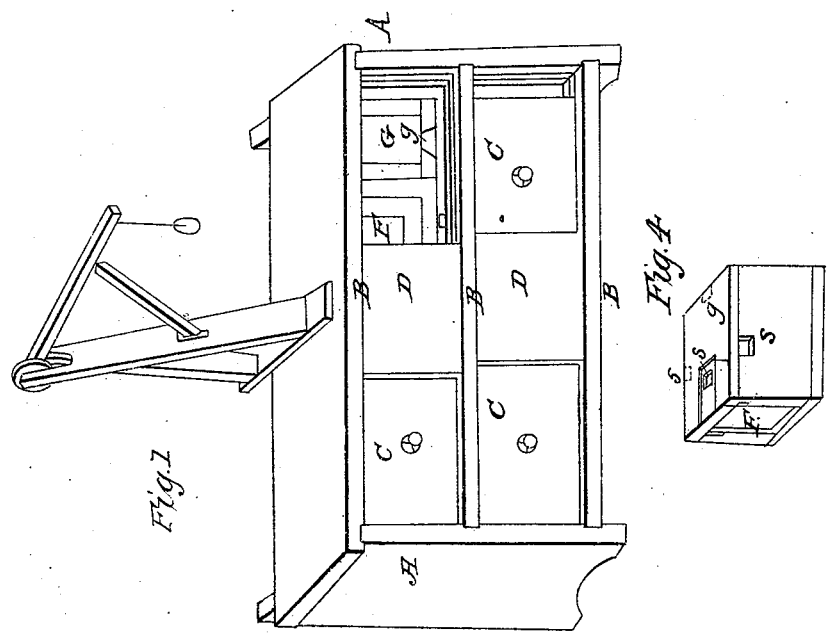

UNITED STATES PATENT OFFICE.

JARVIS CASE, OF SELMA, OHIO.

WORKING THE DOORS OF BEEHIVES.

Specification of Letters Patent No. 7,779, dated November 19, 1850.

*To all whom it may concern:*

Be it known that I, JARVIS CASE, of Selma, in Clark county, in the State of Ohio, have invented a new and useful Improvement in the Beehive; and I do hereby declare that the following is a full, clear, and exact description of the construction and operation of the same, reference being had to the annexed drawings, which make a part of these specifications, in which—

Figure 1 is a perspective view of the rear of the hive; Figs. 2 and 3, the front, and Fig. 4, one of the boxes.

I construct my hive so as to hold two rows of boxes, like that shown in Fig. 4, having 10 or 11 boxes in each row placed horizontally one row above the other, and one box immediately above another. The annexed drawings however, show but four boxes in each row.

In Fig. 1, A, A, are two upright pieces of plank, which form the ends of the hive as well as the legs upon which it stands. B, B, B, are horizontal pieces of plank which make the top, bottom and central division of the hive. C, C, C, are three panels which slide in grooves made for that purpose in the planks B, B, B. The grooves at the top of each panel being so deep as to allow the panel to be raised and taken out at pleasure. D, D, are upright pieces, which are movable in the same grooves as the panels. These pieces are also grooved not only deep enough to receive the edge of the panel, but so that the panel may be pressed into the groove far enough to leave an opening of about half an inch as shown at E. F, and G, are two of the boxes (one of the panels in the drawing being removed). The box F, with glass in the end, is in its usual position in the hive. G is a similar box, with the front end turned to the rear, *g* being a beveled aperture through which the bees pass in and out. There is a space of nearly an inch, between the boxes and the panel work which incloses them in the rear of the hive.

In Fig. 2, the front of the hive is shown with all access to the bees and boxes closed by wire gauze screens (represented by the checked lines) upon a proper frame. These screens extend the whole length of the hive, and are raised or lowered by means of a cord H and pulley *h*, the cord being attached to the upright piece I which is connected with the frame work of the upper screen. Two cords K, K, connect the lower to the upper screen, so that in raising the upper screen, the lower one is raised also. L, L, is a wire brace each end of which being attached to the frame of the screen, and the center, to the upright piece I.

M, is a lever attached to the upright piece I having the piece *m*, for its fulcrum. At the end of the lever is to be suspended so much weight as shall be necessary, acting as a counterweight to the screens, to raise them with the greatest ease. While the screens are down, as in this Fig. 2, and the entrance to the bees and boxes is perfectly closed, the entrance to the moth apartment is open at N, N. The moth is attracted to this opening by old honeycomb placed on wires immediately above the opening at the dotted lines *n, n*. Free access is had to the moth apartment at the doors *o, o*, which are for that purpose. The perpendicular dotted lines at *p, p, p, p*, show the space entirely inclosed within the hive and appropriated to the moth which having once entered, is pretty sure to fall into the tin vessels P, P, at the bottom of the apartment which may contain any liquid which will insure their destruction.

Fig. 3, shows the front of the hive with the screens raised, which gives the bees free access to the several boxes through the openings marked *r*, while the moth apartment is effectually closed. The openings marked *r*, are through a thin board they are opposite to the openings in the boxes (*g* Fig. 1). This board makes a division in the hive so as to leave a space between it and the screens of two and a half or three inches which is the depth of the moth apartment. The openings marked *r* through this division board may either of them be closed at pleasure by a small screen made to turn up or down like a button, which is often convenient in dividing and multiplying swarms, and also in taking out honey.

Fig. 4, represents one of the boxes, the upper side downward. They are all made alike and fit any part of the hive. The ends of the boxes which are accessible in rear of the hive, are of glass marked F, having an opening at *g*, which is the place of entrance for the bees, also openings on each side and at the bottom *s, s, s*, through which the bees may pass from box to box, when the tin separating slides are withdrawn for the purpose.

The best improvements by which swarming is prevented—the swarms or families multiplied and divided, &c., will be found combined in this hive, and these are so arranged as to admit the further improvements which I claim to have invented. It has been found that whenever the moth trap and entrances to the bees are both open, even in the daytime, the moth will crawl in among the bees from his own apartment. This hive is therefore constructed so that in opening the one, the other is closed, and this opening and closing is effected even in the house by means of a cord or wire reaching to the pulley.

To remove any one of my boxes with the honey, I first cut off with the tin slides all communication with the other boxes, pull out the box and reverse the ends, that is, return it to its place with the front end to the rear of the hive—open a crack in the panel (see E Fig. 1) not opposite, but near to the box to be removed. The bees, leaving the box, discover the light and immediately make their escape, returning invariably to the front of the hive. In a short time, the bees are all out of the box, when it may be taken away and an empty box put in its place.

What I claim as my invention and desire to secure by Letters Patent is—

The arrangement of the bee boxes and moth chambers, in combination with the sliding screen doors, pulleys and lever as described, so that the doors may be worked by a single movement of the lever, in the manner and for the purpose set forth.

JARVIS CASE.

Witnesses:
ROBT. ELDER,
MARGERY A. ELDER.